(12) United States Patent
Crepel et al.

(10) Patent No.: US 8,163,316 B2
(45) Date of Patent: Apr. 24, 2012

(54) YOGURT WITH A TWO-PHASE STRUCTURE AND METHOD FOR PRODUCTION THEREOF

(75) Inventors: Pascal Crepel, Gif sur Yvette (FR); Grazyna Kaminska, Plessis Robinson (FR); Olivier Ramage, Villemoisson sur Orge (FR)

(73) Assignee: Compagnie Gervais Danone, Levallois-Perret (FR)

( * ) Notice: Subject to any disclaimer, the term of this patent is extended or adjusted under 35 U.S.C. 154(b) by 998 days.

(21) Appl. No.: 10/544,218

(22) PCT Filed: Feb. 3, 2004

(86) PCT No.: PCT/FR2004/000243
§ 371 (c)(1),
(2), (4) Date: Jun. 12, 2006

(87) PCT Pub. No.: WO2004/068958
PCT Pub. Date: Aug. 19, 2004

(65) Prior Publication Data
US 2006/0216372 A1 Sep. 28, 2006

(30) Foreign Application Priority Data
Feb. 3, 2003 (FR) .................................. 03 01188

(51) Int. Cl.
*A23C 9/12* (2006.01)
(52) U.S. Cl. .......................................................... 426/34
(58) Field of Classification Search .................... 426/34
See application file for complete search history.

(56) References Cited

U.S. PATENT DOCUMENTS
4,163,802 A 8/1979 Redfern et al.

FOREIGN PATENT DOCUMENTS
| EP | 0 049 927 | 4/1982 |
| GB | 1 476 309 | 6/1977 |
| WO | WO 98/42202 | 10/1998 |
| WO | WO 00/19831 | 4/2000 |

OTHER PUBLICATIONS

Meszaros, S. et al. HU 58481-English Abstract.*
FDA-Standards of identity for yogurt.*
Snow Brand Milk Prod Co Ltd, "Yogurt Low Fat Rate Fat Globule Mean Diameter Adjust Suit Value Calculate Predetermined Express", Patent Abstracts of Japan of JP 11-276067, (Oct. 12, 1999).
Kessler, H. G., "Food and Bio Process Engineering: Dairy Technology," (Verlag A. Kessler, 5th ed.), pp. 116, 118-119, 123, and 393-399 (2002).

* cited by examiner

*Primary Examiner* — D Lawrence Tarazano
*Assistant Examiner* — Hamid R Badr
(74) *Attorney, Agent, or Firm* — Finnegan, Henderson, Farabow, Garrett & Dunner, L.L.P.

(57) ABSTRACT

The invention relates to a yogurt with a two-phase structure, comprising fat globules connected to a mixed system of protein material and fatty material and globules of free fat into which a flavor preparation can be incorporated. The invention further relates to a yogurt with a two-phase structure into which a chocolate preparation or a vanilla preparation containing chocolate chips has been incorporated and, furthermore, a method for production of such a yogurt with a two-phase structure.

11 Claims, 5 Drawing Sheets

YOGURT WITH A TWO-PHASE STRUCTURE AND METHOD FOR PRODUCTION THEREOF

The present invention relates to a yogurt of bimodal structure into which may be incorporated a flavored preparation such as a chocolate-flavored preparation. The invention also relates to a process for manufacturing such a yogurt.

Dairy specialty products flavored with "hot" flavorings are generally very much appreciated by consumers. Examples of hot flavorings that may especially be mentioned include chocolate, cocoa, caramel, vanilla, coffee, praline, nougat, honey, flavorings from oil-yielding fruit, especially such as walnut, hazelnut, almond and pistachio, and flavorings from spices especially such as cinnamon, coriander and curry. For example, the Danette products, sold by the Danone group, are hot-flavored dairy specialty products that are very much appreciated by consumers. These specialty products are unfermented dairy products, which have pH values generally of between 6 and 7.

Tests of marketing of hot-flavored yogurts, such as chocolate-flavored yogurts have never been fruitful. Specifically, a chocolate-flavored yogurt tested by a panel of consumers receives a low overall satisfaction grade. This absence of consumer satisfaction may especially be explained by the organoleptic incompatibility between fermented dairy products, such as yogurts, and hot flavorings, especially chocolate flavorings. Specifically, during the process for manufacturing a fermented dairy product, especially a yogurt, the fermentation step results in the production, within the dairy bulk, of lactic acid. The presence of lactic acid in the dairy bulk reduces the pH values of said bulk. In the case especially of a yogurt, the pH is then lowered to values of between 4 and 5. However, in acidic medium, chocolate and cocoa have a bitter taste and false tastes, such as fermented aromatic notes. Thus, the use of hot flavorings to flavor fermented dairy products, such as yogurts or unripened cheese, with pH values of between 4 and 5, is limited due to the presence of an aftertaste and strong acidity, which denature the true taste of the flavorings used.

In processes for manufacturing unripened cheese, it is known practice to incorporate fat, especially cream, into a low-fat paste that has already undergone at least one fermentation step. This process of incorporating cream into the fermented bulk allows the bulk to be enriched with fat up to a nutritionally and sensorily desired value.

However, a process characterized by the incorporation of sweetened or unsweetened, homogenized or unhomogenized cream into a fermented bulk is not used in yogurt manufacturing processes for reasons of complexity of the process and/or for economic or traditional reasons of manufacture of a yogurt. In standard processes for manufacturing a yogurt, a single mix is developed by mixing together all the dairy ingredients of the future yogurt and, optionally, ingredients such as sugar. This single mix is then homogenized, pasteurized, seeded with specific thermophilic lactic acid bacteria, *Streptococcus thermophilus* and *Lactobacillus delbruekii bulgaricus*, and fermented. After cooling, the white mass obtained is packaged directly, alone or after mixing with a fruit or aromatic preparation. In such a process for manufacturing a yogurt; the fermentation step, during which the whole protein network, consisting of the aggregation of proteins present in the dairy bulk, is formed, takes place in the presence of small, homogeneous fat globules. These globules thus participate fully and intimately in the construction of a Protein-Fat mixed network, i.e. a dense mixed network with the substantial nesting of the fat globules in the protein network.

A yogurt of monomodal structure is thus observed, i.e. in which the fat globules have diameters distributed about a predominant mean value. Advantageously, if the distribution of the fat globule diameters is represented on a graph showing the volume occupied by the particles, expressed as a percentage, relative to the total volume, as a function of the Naperian logarithm of the diameter of the fat globules, a Gaussian distribution is observed, about a mean value (see FIG. 2). In conclusion, homogeneity of the protein and lipid phases is observed (see FIG. 4).

Surprisingly, the Applicant has developed a yogurt of bimodal structure, whose perceived acidity in the mouth is considerably reduced.

Similarly, the Applicant has discovered a novel process for manufacturing a yogurt of bimodal structure.

The Applicant has discovered, entirely surprisingly, that the yogurt with a bimodal structure is perceived in the mouth as being less acidic than a product produced from the fermentation of a single mix. Said yogurt may thus be combined with a preparation containing a hot flavoring, especially a chocolate flavored preparation or a vanilla flavored preparation with chocolate chips. The products thus obtained are appreciated and highly graded by consumers.

For the purposes of the present invention, the term "yogurt" means a coagulated dairy product obtained by lactic acid fermentation by means of the action of thermophilic microorganisms, derived from *Streptococcus thermophilus* and *Lactobacillus delbruekii bulgaricus* cultures, starting with milk and dairy products. It is the presence of these two bacterial strains that characterizes the designation yogurt. These specific microorganisms must be viable, in an amount of at least $10^7$ CFU/g on the best before date, the abbreviations CFU meaning colony-forming unit. The lactic acid fermentation results in a reduction in the pH and coagulation.

The dairy products are chosen from the group consisting of pasteurized milk, concentrated milk, pasteurized partially skimmed milk, concentrated partially skimmed milk, pasteurized skimmed milk, concentrated skimmed milk, pasteurized cream, pasteurized low-fat cream, and mixtures thereof.

The yogurt according to the invention may also optionally contain added dairy raw materials or other ingredients such as sugar or sweetening agents, one or more flavoring(s), fruit, cereals, or nutritional substances, especially vitamins, minerals and fiber. The dairy raw materials are chosen from the group consisting of powdered milk, powdered skimmed milk, unfermented buttermilk, partially or totally dehydrated liquid buttermilk, concentrated whey, whey powder, whey proteins, concentrated whey proteins, water-soluble dairy proteins, milk protein-based preparations containing a minimum of 34% total nitrogenous matter, dietary casein and caseinates manufactured from pasteurized products. For the purpose of the present invention, the term "sugar or sweetening agent" means any sweetening carbohydrate.

By extension, for the purposes of the present invention, products also comprising lactic acid bacteria, other than the microorganisms *Streptococcus thermophilus* and *Lactobacillus delbruekii bulgaricus*, and especially microorganisms derived from *Bifidobacterium* and/or *Lactobacillus acidophilus* and/or *Lactobacillus casei* strains, may also be termed yogurt. These additional lactic acid strains are intended to give the finished product various properties, such as the property of promoting the equilibrium of the flora. In the finished product, the microorganisms must be in viable form.

Such a yogurt thus satisfies the specifications for fermented milks and yogurts of AFNOR standard NF 04-600 and of the codex standard. Stan A-11a-1975. AFNOR standard NF 04-600 states, inter alia, that the product must not have been heated after fermentation. Furthermore, in a yogurt, the dairy products and the dairy raw materials must represent a minimum of 70% (m/m) of the finished product.

One subject of the present invention is thus a yogurt, characterized in that it has a bimodal structure, i.e. in which the diameters of the fat globules are distributed about two predominant values.

In the product according to the invention, fat globules connected to a Protein-Fat mixed network, formed during the fermentation step, on the one hand, and aggregates of free fat globules, i.e. not connected to the Protein-Fat network, on the other hand, are observed, entirely surprisingly (see FIG. 5).

Thus, the yogurt according to the invention is characterized by its bimodal structure, which comprises, on the one hand, free fat globules having a particle diameter of between 0.05 and 3 µm, advantageously between 0.31 and 0.42 µm and even more advantageously between 0.33 and 0.39 µm, and, on the other hand, fat globules connected to the protein network, having a particle diameter of between 10 and 140 µm, advantageously between 41 and 76 µm and even more advantageously between 48 and 65 µm (see FIG. 3).

In comparison, a yogurt of the prior art has a monomodal structure in which the fat globules are connected to the protein network and have a particle diameter of between 10 and 140 µm, advantageously between 41 and 76 µm and even more advantageously between 4.8 and 65 µm.

The Sauter diameter of the yogurt according to the invention is characteristically two to four times greater than that of a homogenized cream, used in the process according to the invention, and at least 20 times smaller than that of a yogurt of monomodal structure, advantageously than that of the yogurt of monomodal structure used in the process according to the invention. Even more advantageously, the Sauter diameter of the yogurt according to the invention is characteristically at least 40 times smaller than that of the yogurt of monomodal, structure used in the process according to the invention.

The value $D_{(V, 0.9)}$ of the yogurt according to the invention is characteristically at least 40 times, advantageously at least 60 times and even more advantageously at least 70 times greater than that of a homogenized cream used in the process according to the invention. The value $D_{(V, 0.9)}$ of the yogurt according to the invention is characteristically 0.9 to 1 times that of the yogurt of monomodal structure used in the process according to the invention.

In one particular embodiment of the invention, the yogurt according to the invention is characterized by a Sauter diameter D(3.2) of between 0.70 µm and 1.00 µm, advantageously between 0.78 µm and 0.90 µm and a value $D_{(V, 0.9)}$ of between 70.00 µm and 80.00 µm and advantageously between 74.00 µm and 75 µm.

In comparison, a yogurt of the prior art, of monomodal structure, is characterized by a Sauter diameter D(3.2) of between 45.00 µm and 46.00 µm and a value $D_{(V, 0.9)}$ of between 75.00 µm and 76.50 µm.

The Sauter diameter D(3.2) is the mean weight diameter of the fat globules at the surface. It is defined as the mean of the ratio between the volume equivalent diameter $d_v$ and the surface area equivalent diameter $d_s$:

$$D(3.2) = \Sigma d_v^3 / \Sigma d_s^2$$

The equivalent diameter is the diameter that the particle would have if it were spherical, thus $d_v$ is the volume equivalent diameter and $d_s$ the surface area equivalent diameter. Thus, $$d_v = (6 V_p / \pi)^{1/3}$$

$$d_s = (A_p / \pi)^{1/2}$$

with $V_p$ being the volume of the particle and $A_p$ the surface area of the particle.

The value $D_{(V, 0.9)}$ represents the particle size value for which the particle distribution is such that exactly 90% of the particles of the sample (v/v) are less than or equal to said value.

In one particular embodiment of the invention, a Sauter diameter D(3.2) of between 0.78 µm and 0.90 µm and a value $D_{(V, 0.9)}$ of between 74.00 µm and 75.00 µm are advantageous characteristics of the yogurt according to the invention.

A Sauter diameter D(3.2) at least three times greater than that of a homogenized cream, used in the process according to the invention, and at least 40 times less than that of the yogurt of monomodal structure, used in the process according to the invention, is an advantageous characteristic of the yogurt according to the invention.

A value $D_{(V, 0.9)}$ at least 60 times greater than that of a homogenized cream, used in the process according to the invention, and 0.95 to 1 times that of the yogurt of monomodal structure used in the process according to the invention, is an advantageous characteristic of the yogurt according to the invention.

The fat globule diameter values are preferentially determined using a laser granulometry method. In the granulometry method, a Mastersizer S (MSS) machine (Malvern), helium-neon laser source with a focal lens of 300 mm, is advantageously used. The samples measured are prehomogenized and then diluted in 1% sodium dodecyl sulfate, SDS. On becoming adsorbed onto the hydrophobic parts of the casein micelles and of the whey proteins, the SDS causes their desagglomeration by electrostatic repulsion. The addition of SDS makes it possible to prevent the agglomeration of proteins, in particular of those that stabilize the fat. It gives a precise image of the size of the fat droplets, by overcoming their agglomeration. This technique makes it possible to evaluate the Sauter diameter D(3.2) of the particles and to calculate the value $D_{(V, 0.9)}$.

Advantageously, the yogurt is characterized in that it is perceived in the mouth by the consumers as being less acidic than a standard yogurt of monomodal structure.

The sensory profile serves to create an organoleptic identity card for the product according to the invention. It is the description of a product, with a set of standardized descriptors, by a group of individuals trained to quantify these descriptors on an evaluation scale. This group of trained individuals constitutes the sensory panel. The sensory panel is composed of individuals recruited by means of recruitment tests based on sensory capacities, verbal expression and behavior. The panel is trained for six months to describe products with a standardized language and to use a grading scale. At the end of the training, the panel must achieve a certain level of performance, it must be repeatable and discriminating and the judges must be in consensus. The tests that it performs will first be "sequential monatic", i.e. no comparison is made, and then comparative, between a yogurt of the same composition of monomodal structure and a yogurt according to the invention. The sensory panel is composed of 15 individuals, who taste the same product twice according to a given experimental plan; each will not taste the same product first. Each person of the panel will report these choices on a computer. The data will be processed statistically, by means of an Anova test.

All things being otherwise equal, i.e. the protein content, the fat content, the carbohydrate content, the pH and the Dornic acidity, the yogurt according to the invention is perceived in the mouth as being less acidic than a standard yogurt.

It is assumed that the difference in organoleptic perception of the yogurt according to the invention is due to the presence of free fat globules of very small diameter, between 0.05 and 3 μm, which must have an effect of masking in the mouth the acidity of the yogurt. The free fat globules must have a lining effect in the mouth and it may be that they thus mask the acidity of the yogurt according to the invention. It is assumed that said small free fat globules thus mechanically reduce the perception of acidity of the product according to the invention, by the sensory receptors. In conclusion, this very different organoleptic perception is quite probably due to the particle size profile of the product, which is different than that of a standard yogurt.

According to one advantageous variant of the invention, a flavored preparation is incorporated into said yogurt. Advantageously, this flavored preparation is a chocolate-flavored preparation or a vanilla-flavored preparation with chocolate chips.

For the purposes of the present invention, the term "flavored preparation" means any preparation that may be used conventionally to perfume a yogurt or a dairy product-based product. Said preparation may thus especially contain one or more flavoring(s), including hot flavorings, fruit, especially fresh fruit and/or conserved and/or frozen and/or powdered fruit and/or fruit puree and/or fruit pulp and/or fruit syrup and/or fruit juice, cereals, or nutritional substances, especially vitamins, minerals and fiber.

Examples of hot flavorings that may especially be mentioned include chocolate, cocoa, caramel, vanilla, coffee, praline, nougat, honey, flavorings from oil-yielding fruit, especially such as walnut, hazelnut, almond and pistachio and flavorings from spices especially such as cinnamon, coriander and curry.

The novel particle-size profile of the yogurt according to the invention modifies its organoleptic perception, which is then perceived as being less acidic. The incorporation of a hot flavoring into such a yogurt makes it possible to obtain a tasty yogurt, in which the bitterness and the false tastes that hot flavorings usually have, especially chocolate and cocoa, in acidic medium are not perceived.

The yogurt according to the invention may also comprise food additives. The use of these additives will need to be in accordance with the regulations in force. These additives may be sweeteners and/or flavorings and/or dyes and/or preserving agents conventionally used by those skilled in the art in the context of the manufacture of food products, and especially in the context of the production of yogurts. Since this list is not limiting, other food additives may be used, under two conditions: they must not be added directly into the dairy compounds, and they will only be provided by added ingredients.

One subject of the present invention is thus a process for preparing a yogurt as described above, characterized in that it comprises the following steps:
  a) manufacture of a yogurt according to a standard process of the art;
  b) manufacture of a homogenized cream;
  c) mixing of the yogurt bulk with the homogenized cream;
  d) production of a yogurt of bimodal structure.

Advantageously, step a) of manufacture of a yogurt comprises at least one step of lactic acid fermentation. Advantageously, step a) of manufacture of a yogurt comprises at least one stirring step.

Advantageously, the homogenized cream added during step c) is sweetened.

The proportions of homogenized cream to be added depend on the nature and the fat content of the cream used in the manufacturing process and also on the nature and the fat content of the yogurt bulk used in the manufacturing process. A person skilled in the art, in the light of his "standard" general knowledge, is perfectly capable of determining the minimum amounts of homogenized cream to be added, in order to modify the organoleptic perception of the final product, and the maximum amounts of homogenized cream to be added, in order to maintain the designation yogurt.

In one advantageous embodiment of the invention, the proportions of cream added to the yogurt bulk are between 7% and 14% (m/m) of homogenized cream, relative to the total weight of the finished product, and advantageously between 9% and 12% (m/m) of homogenized cream, relative to the total weight of the finished product. Since the final product comprises a minimum of 70% (m/m) of dairy products and of dairy raw materials, in order especially to be able to benefit from the designation yogurt, the weight amount of yogurt bulk in the finished product is at least 56% (m/m) relative to the total weight of the finished product.

For the purposes of the present invention, the term "homogenized cream" means a prepasteurized cream derived from milk, which has been subjected to a heat treatment and to homogenization. This cream may advantageously be sweetened.

The cream may be sweetened by means of any sweetening agent, i.e. any sweetening carbohydrate, conventionally used by a person skilled in the art. Examples of sweetening agents that may especially be mentioned include beet sugar or white sugar, cane sugar or brown sugar and sweeteners such as aspartame, saccharin, cyclamate, acesulfame K and thaumatine.

Homogenization is a process that is well known to those skilled in the art, which makes it possible to produce fat globules whose diameters have, within a narrow spectrum, a low mean, of about from 0.1 to 1.0 μm, and a low standard deviation.

The homogenization operation is performed at a temperature above 60° C. in a homogenizer, which is a machine for spraying milk at a very high pressure, of about from 150 to 350 kg/cm$^2$, into a tube at the end of which is a conical clack valve made especially of agate or steel. On working its way between this valve and its seating, the cream becomes laminated and the physicochemical structure of the globular membrane is modified. The homogenization takes place in one step or two steps.

The yogurt bulk is produced according to a known method of the art. By way of illustration, step a) of manufacturing a yogurt, according to a standard process of the art, includes the following steps:
  i) mixing of the prepasteurized or concentrated and standardized milk;
  ii) heat treatment followed by homogenization of the mix obtained after step i);
  iii) cooling of the mix to the fermentation temperature, followed by seeding of the mix with the specific thermophilic lactic acid bacteria *Lactobacillus, bulgaricus* and *Streptococcus thermophilus*;
  iv) cooling to a temperature of between 15 and 25° C.;
  v) storage.

According to one advantageous mode of the invention, the prepasteurized or concentrated and standardized milk is mixed, in step i), with a mixture of proteins, advantageously of caseinates and whey proteins, and optionally with a sweetening agent. Advantageously, the protein mixture and the sweetening agent are in the form of powders. For the purposes of the present invention, the prepasteurization corresponds to a heat treatment of the raw milk, which is intended to destroy the pathogenic microorganisms and to reduce the total flora. According to a standard process, the prepasteurization is performed at a temperature of between 70 and 80° C. and advantageously at a temperature of about 72° C. for about 30 seconds.

The standardization of the fat and of the proteins of the milk corresponds to a development of the dairy mix by assembling the dairy raw materials to obtain a precise protein and fat content.

In a conventional manner, the heat treatment, in step ii), takes place at a temperature of between 80 and 100° C.

Optionally, the fermentation step iii) also includes the addition of other lactic acid bacteria, such as *Bifidobacterium* and/or *Lactobacillus acidophilus* and/or *Lactobacillus casei* strains.

The fermentation temperature is advantageously between 30 and 50° C., more advantageously between 35 and 45° C. and even more advantageously between 37 and 41° C. The product set to ferment is cooled, once it has reached the desired acidity, to a temperature of between 15 and 25° C. and advantageously to a temperature of between 18 and 22° C. Advantageously, the targeted acidity corresponds to pH values of between 4 and 5 and more advantageously between 4.2 and 4.8.

The yogurt thus obtained is then stored in a storage tank, advantageously at a temperature of between 15 and 25° C. and even more advantageously at a temperature of between 18 and 22° C.

The homogenized cream is produced according to a known method of the art. By way of illustration, step b) of manufacture of a homogenized sweetened cream, according to a standard process of the art, includes the following steps:
  i) mixing of a prepasteurized cream;
  ii) heat treatment, followed by homogenization;
  iii) sterilization;
  iv) cooling, followed by storage.

Advantageously, in step i), a sweetening agent is incorporated into the prepasteurized cream. For the purposes of the present invention, the term "sweetening agent" means any material usually used by a person skilled in the art to give a sweet taste to food products. Examples of sweetening agents that may especially be mentioned include beet sugar or white sugar, cane sugar or brown sugar, and sweeteners such as aspartame, saccharin, cyclamate, acesulfame K and thaumatine.

The homogenization step makes it possible to produce fat globules whose diameters have a low mean, of about from 0.1 to 1.0 µm, and a low standard deviation, i.e. a narrow spectrum.

Sterilization is advantageously performed at a temperature above 100° C. for a fairly short time. Advantageously, the sterilization time is between 10 and 30 seconds.

The cream is then cooled to a temperature advantageously between 5 and 15° C. and more advantageously to a temperature of between 6 and 10° C.

The cream thus obtained is then stored in a storage tank, advantageously at a temperature of between 5 and 15° C. and even more advantageously at a temperature of between 6 and 10° C.

According to one advantageous variant of the invention, the mixing step c) first includes a step of in-line or in-tank (batchwise) incorporation of the homogenized sweetened cream into the yogurt bulk, followed by a step of mixing the homogenized sweetened cream and the yogurt bulk, in-line in a static or dynamic mixer, or in-tank. Advantageously, the step of mixing of the homogenized sweetened cream and of the yogurt bulk takes place in a static mixer.

According to another advantageous variant of the invention, the preparation process also includes a step e) of incorporating a flavored preparation into the yogurt of bimodal structure.

The proportions of flavored preparation to be added depend on the nature of the flavored preparation used, especially on its concentration of flavoring and of the flavoring used, and also on the nature, particularly the taste, of the final targeted product. A person skilled in the art, in the light of his "standard" knowledge, is entirely capable of determining the minimum and maximum amounts of flavored preparation to be added.

In one advantageous embodiment of the invention, the proportions of flavored preparation added to the yogurt of bimodal structure are between 10% and 18% (m/m) and advantageously between 12% and 16% (m/m) of flavored preparation relative to the total amount of finished product.

For the purposes of the present invention, the term "flavored preparation" means any preparation that may be conventionally used to perfume a yogurt or a product derived from dairy products. Said preparation may thus especially contain one or more flavoring(s), including hot flavorings, fruit, cereals or nutritional substances, especially vitamins, minerals and fiber. Examples of hot flavorings that may especially be mentioned include chocolate, cocoa, caramel, vanilla, coffee, praline, nougat, honey, flavorings from oil-yielding fruit, especially such as walnut, hazelnut, almond and pistachio, and flavorings from spices especially such as cinnamon, coriander and curry.

Advantageously in the preparation process according to the present invention, the flavored preparation is incorporated in-line or in-tank (batchwise) into the yogurt of bimodal structure and then mixed in-tank or in-line by means of a static or dynamic mixer, and even more advantageously using a dynamic mixer.

In a particularly advantageous manner, the flavored preparation incorporated is a chocolate-flavoured preparation or a vanilla-flavored preparation with chocolate chips.

According to another advantageous variant of the invention, the preparation process also includes a step f) of packaging followed by cooling and finally storage.

Advantageously, the yogurt according to the invention is cooled after packaging to a temperature of between 2 and 6° C.

The yogurt according to the invention thus obtained may also be stored in a storage tank, advantageously at a temperature of between 5 and 22° C., before being packaged and then cooled to a temperature of between 2 and 6° C.

A subject of the present invention is also a yogurt that may be obtained via the process as described above, characterized in that it has a bimodal structure.

Figure 1:
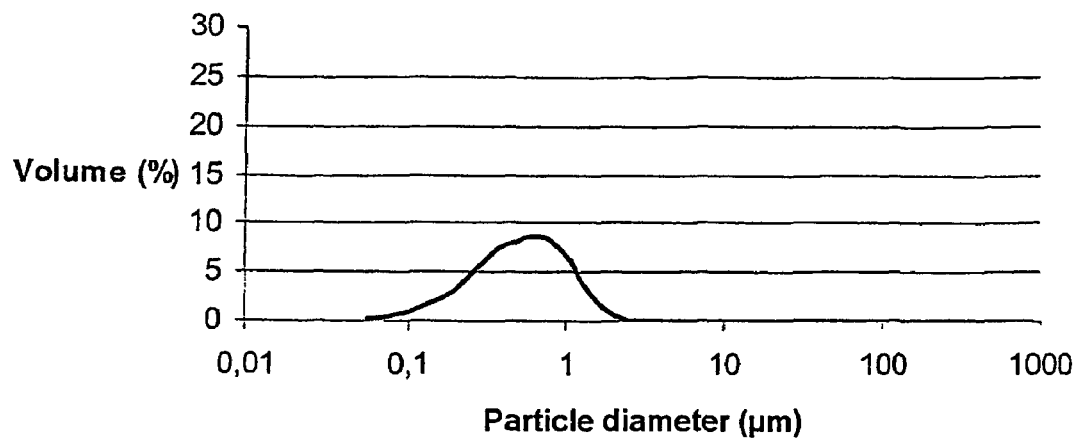
FIG. 1 illustrates the particle size distribution of the fat globules in a homogenized sweetened cream (experiments 1 and 2). A monomodal distribution is observed.
Figure 1:
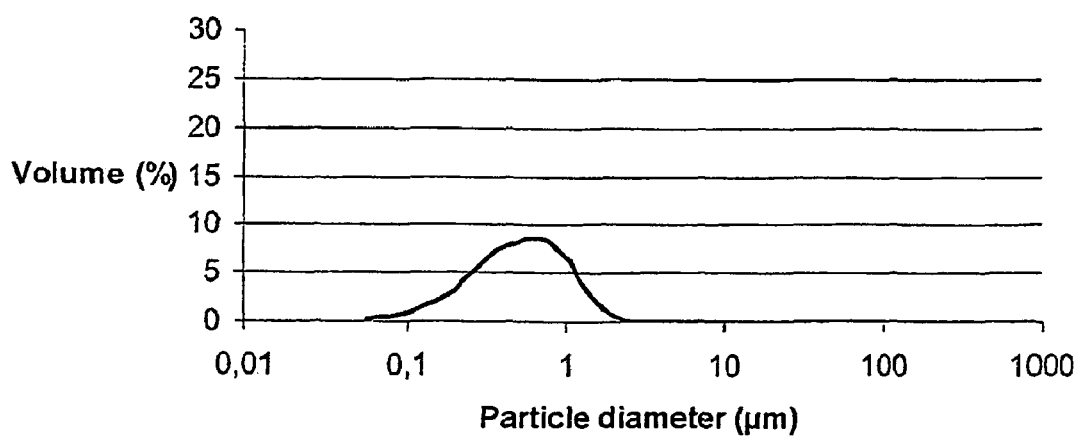

The examples that follow illustrate the invention without, however, limiting its scope.

EXAMPLE 1

Formulation of a Chocolate-Flavored Yogurt According to the Invention

Formulation of a chocolate-flavored yogurt according to the invention:

| Yogurt bulk | 75.5 w/w % |
|---|---|
| Homogenized sweetened cream | 10.5 w/w % |
| Chocolate-flavored preparation | 14 w/w % |

The yogurt bulk is composed of 3.7 w/w % fat, with a total protein content of 4.23 w/w % and comprises 7.2 w/w % sucrose, mixed with homogenized sweetened cream composed of 20 w/w % fat and 15 w/w % sucrose.

This finished-product is composed of 6.4 w/w % fat, 3.6 w/w % in total of protein and 15.5 w/w % carbohydrates, including 7 w/w % sucrose.

The sum of the non-dairy and unfermented dairy ingredients in the finished product is less than 30% by weight. This product thus satisfies the legal constraints of the designation yogurt.

EXAMPLE 2

Process for Preparing a Chocolate-Flavored Yogurt According to the Invention a) Manufacture of the Yogurt Bulk A preparation based on milk and dairy products is preheated to 81° C., degassed and then heated to 89° C. It is then homogenized while hot and at a pressure of 250 bar. On leaving the homogenizer, the preparation should be at a temperature of 95° C. After the homogenization step, the preparation is pasteurized for 8 minutes at 95° C. and then brought to room temperature. The preparation is then cooled to a temperature of 4° C.

Next, the preparation is seeded with thermophilic lactic acid bacteria, at least with the lactic acid bacteria derived from the strains *Streptococcus thermophilus* and *Lactobacillus delbruekii bulgaricus*, and heated to 39° C. The preparation is left to ferment. When the yogurt bulk has sufficiently fermented, i.e. when it has reached an acidity corresponding to a pH value of about 4.65, it is smoothed on a 0.5 mm filter and then cooled to a temperature of 20° C.

Depending on the desired characteristics of the final product, a person skilled in the art knows which parameters of the process he should modify.

b) Manufacture of the Homogenized Cream

Skimmed milk is sweetened and mixed with a cream containing 400 g/l of fat. This preparation is filtered at 0.5 mm. It is then preheated to 95° C. and then maintained at room temperature for 6 minutes, before being homogenized at a total pressure of 205 bar. After the homogenization step, the preparation is pasteurized at a temperature of 118° C. and then cooled to 6° C.

Depending on the desired characteristics of the final product, a person skilled in the art knows which process parameters he should modify.

c) Mixing of the Yogurt Bulk with the Sweetened Homogenized Cream and Incorporation of the Chocolate-Flavored Preparation 10.5% of sweetened homogenized cream is incorporated into 75.5% of yogurt bulk in a static mixer. 14% by mass of a vanilla-flavored preparation with chocolate chips is then incorporated, in a dynamic mixer. The percentages are expressed by mass relative to the total mass of the finished product.

The yogurt is packaged and stored in a cold chamber.

EXAMPLE 3

Measurement of the Particle Size Distribution of the Fat Globules a) Test Products The particle size distribution of the fat globules in the following products was measured:
  a homogenized sweetened cream;
  a yogurt obtained via the standard process (standard yogurt);
  a yogurt obtained via the process of the invention in which the fat has been added after the fermentation step.

b) Measuring Method

In order to determine the structure of the products, laser granulometry methods were used. In the granulometry method, a Mastersizer S (MSS) machine (Malvern), with a helium-neon laser source with a 300 mm focal lens, was used. The measured samples were prehomogenized and then diluted in 1% SDS. On becoming adsorbed onto the hydrophobic parts of the casein micelles and of the whey proteins, the SDS causes their desagglomeration by electrostatic repulsion. The addition of SDS makes it possible to prevent the agglomeration of proteins, in particular of those that stabilize the fat. It gives a precise image of the size of the fat droplets, by overcoming their agglomeration. This technique makes it possible to evaluate the Sauter diameter D(3.2) of the particles and to calculate the value $D_{(V,0.9)}$. The measuring protocol of the granulometry method is as follows:
  1. switching on the laser for at least 30 minutes before taking a measurement (warming-up time of the machine).
  2. configuration of the equipment:
    300 mm focal lens;
    polydispersity analysis;
    refractive index: water 1.33; fat 1.46;
    alignment of the laser;
    measurement of the background noise.
  3. preparation of the sample (dilution in the presence of 1% SDS)
  4. placing of the sample in the measuring cell to obtain a turbidity level of from 15% to 30%
  5. starting of the measurement:
    evaluation of the size distribution of the fat globules;
    calculation of the Sauter diameter D(3.2) and of D(v,0.9)

6. cleaning with distilled water between each measurement.

To ensure the reproducibility of the measurements and to overcome the uncertainties associated with handling, two measurements are taken per sample.

c) Results

The values obtained for the main parameters are summarized in table 1 below:

TABLE 1

|  | D(3.2) μm | | D(v, 0.9) μm | |
| --- | --- | --- | --- | --- |
|  | Experiment 1 | Experiment 2 | Experiment 1 | Experiment 2 |
| Homogenized sweetened cream | 0.35 | 0.35 | 1.04 | 1.04 |
| Standard yogurt | 45.65 | 45.38 | 76.14 | 75.55 |
| Yogurt according to the invention | 0.83 | 0.87 | 74.64 | 74.22 |

D(3.2) corresponds to the Sauter diameter, which illustrates the mean size of the fat globules. The value $D_{(V,0.9)}$ represents the particle size value for which a particle distribution is observed such that exactly 90% of the particles of the sample (v/v) have a size less than or equal to this value.

FIG. 1 shows the particle size distribution of the fat globules in the homogenized sweetened cream (experiments 1 and 2). A monomodal distribution and a particle diameter of the fat globules of between 0.05 μm and 2.28 μm are observed.

Figure 2:
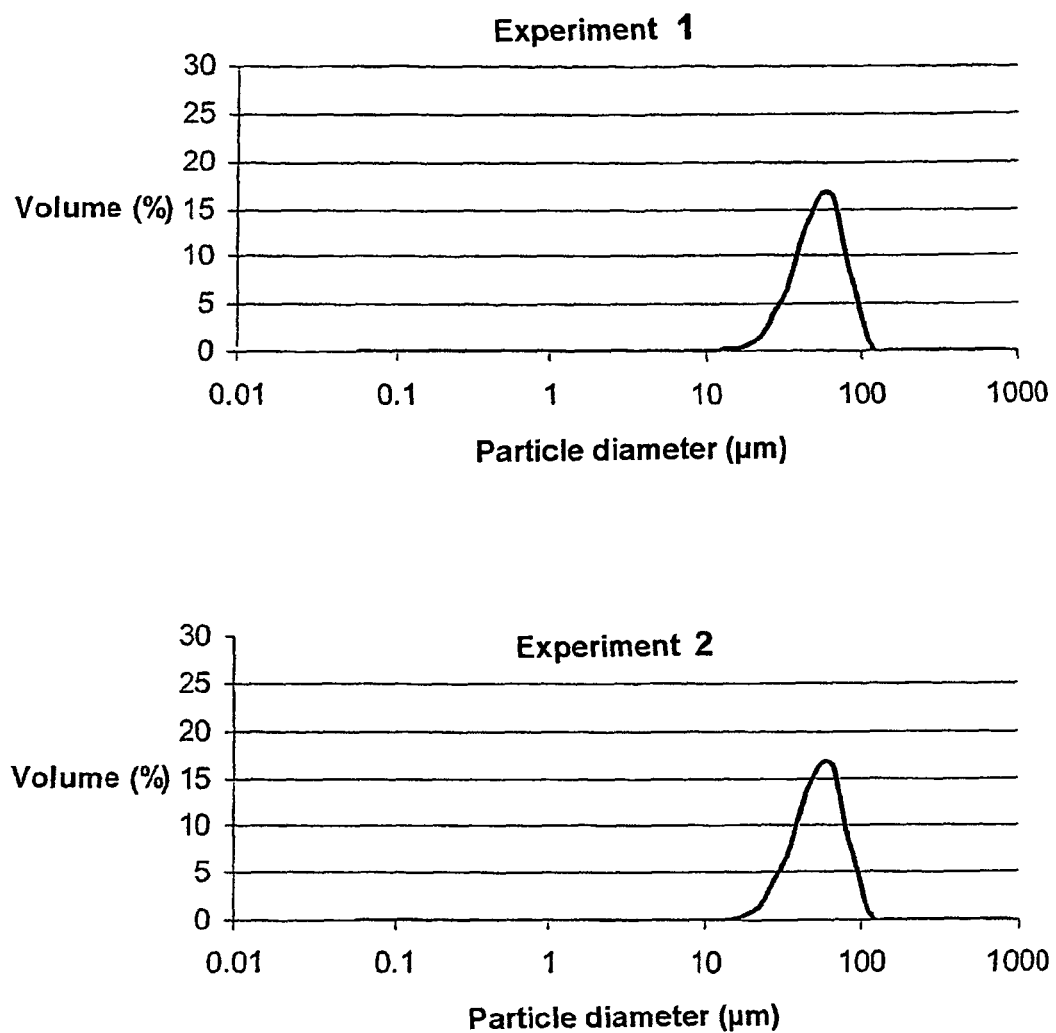
FIG. 2 illustrates the particle size distribution of the fat globules in a standard yogurt (experiments 1 and 2). A monomodal distribution is observed.

FIG. 2 illustrates the particle size distribution of the fat globules in the standard yogurt (experiments 1 and 2). A monomodal distribution and a fat globule particle diameter of between 12.21 μm and 120.67 μm are observed.

Figure 3:
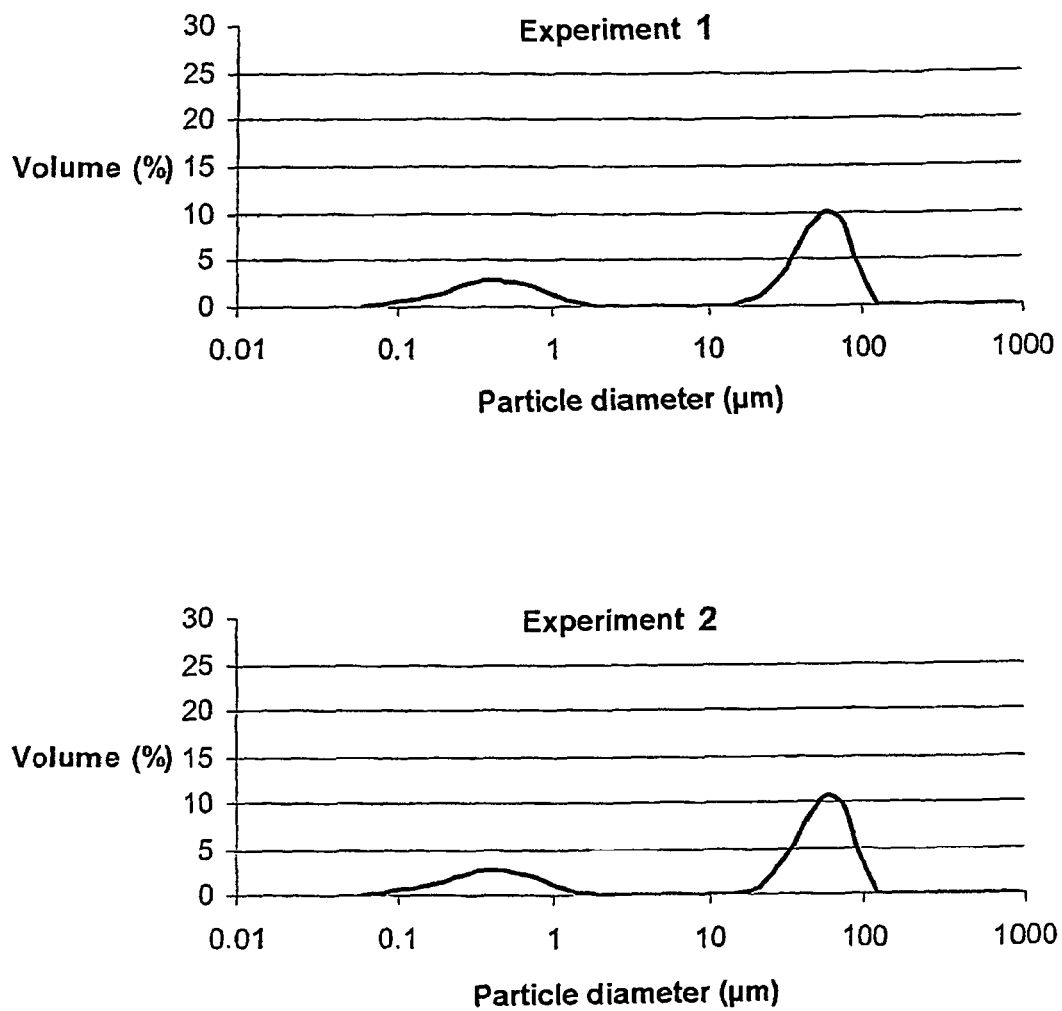
FIG. 3 illustrates the particle size distribution of the fat globules in a yogurt according to the invention (experiments 1 and 2). A bimodal distribution is observed.

FIG. 3 illustrates the particle size distribution of the fat globules in the yogurt according to the invention (experiments 1 and 2). A1bimodal distribution and a fat globule particle diameter of between 0.05 μm and 2.65 μm, on the one hand, and between 14.22 μm and 120.67 μm, on the other hand, are observed.

d) Conclusions

The yogurt according to the invention has a bimodal structure, due to the presence of free small fat globules and the presence of larger fat globules connected to the protein network.

EXAMPLE 4

Observation by Optical Microscope a) Test Products

The particle size distribution of the fat globules was measured in the following-two products:
a yogurt obtained via a standard process containing 6% fat, i.e. a standard yogurt of monomodal structure;
a yogurt obtained via the process of the invention, from a yogurt bulk containing 3.7% fat and a homogenized sweetened cream containing 20% fat.

b) Measuring Method

The optical microscopy method is based on the principle of fluorescence, and this tool allows the structure to be observed in terms of size and distribution of the aggregates. The fat is stained with the staining marker Nile blue.

This tool allows the structure to be observed in terms of size and distribution, of the protein aggregates in which the fatty phase is included, and of the pores containing the soluble phase, including the soluble proteins.

Figure 4:
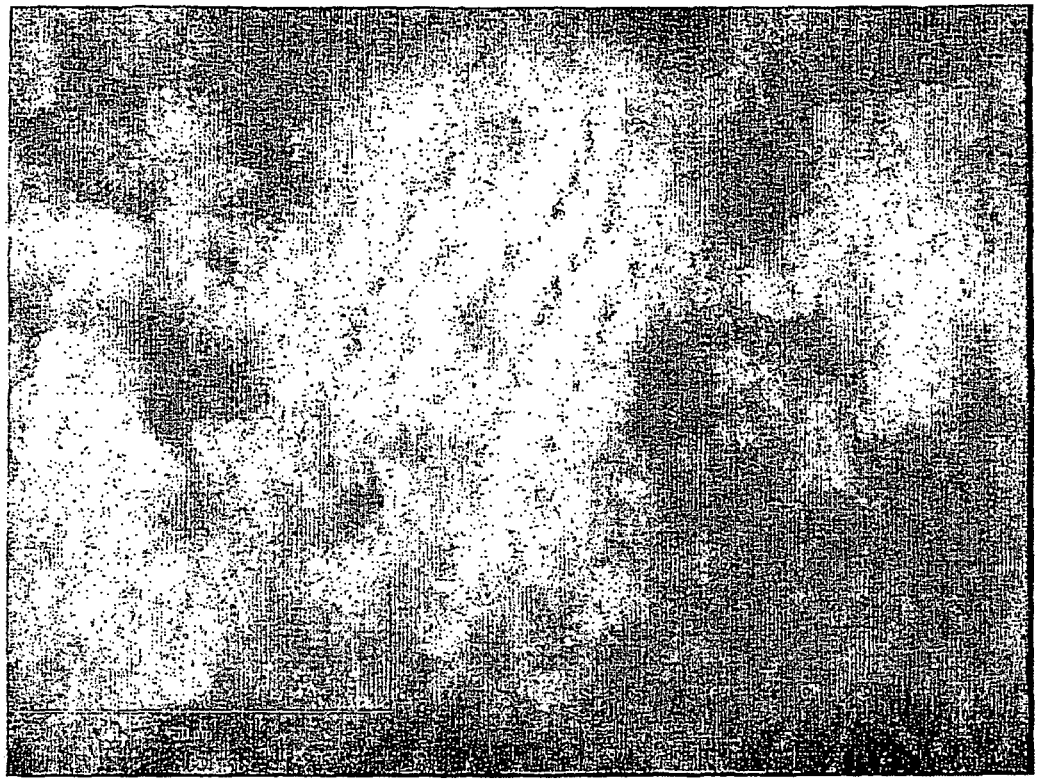
FIG. 4 represents a microscopic observation of a yogurt of monomodal structure, obtained via a standard process, containing 6% fat.
Figure 5:
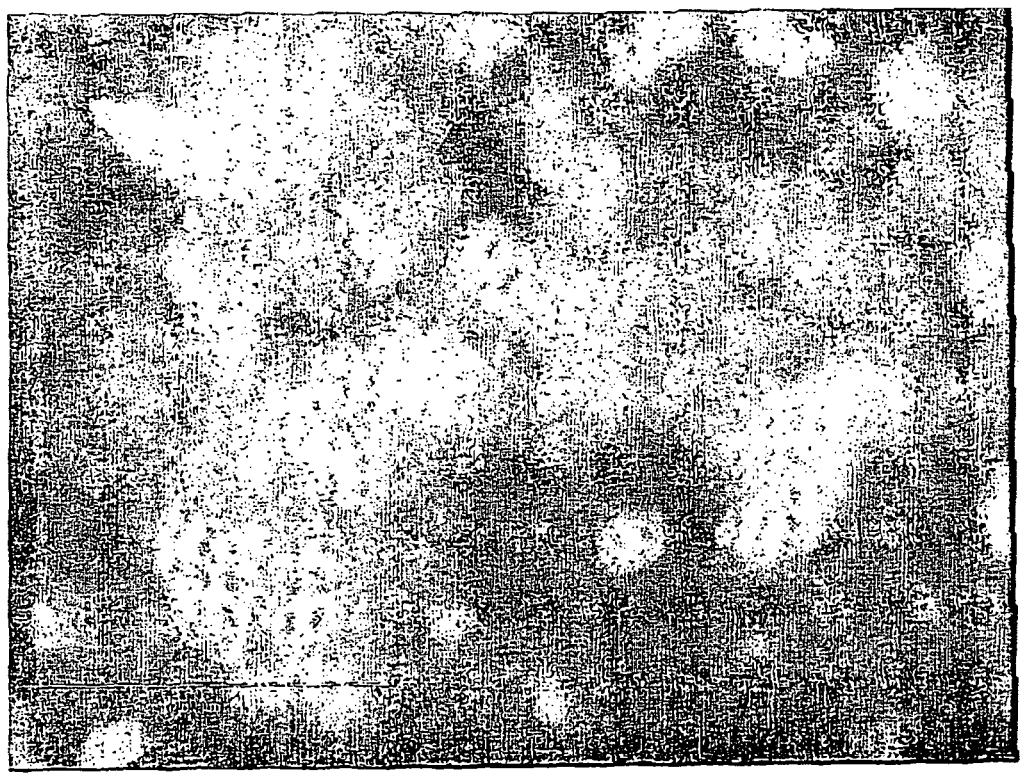
FIG. 5 shows a microscopic observation of a yogurt obtained via the process of the invention, starting with a yogurt bulk containing 3.7% fat and a homogenized sweetened cream containing 20% fat.

A yogurt of monomodal structure, obtained via a standard process, containing 6% fat (FIG. 4) and a yogurt obtained via the process of the invention, starting with a yogurt bulk containing 3.7% fat and a homogenized sweetened cream containing 20% fat (FIG. 5) are observed by microscope.

c) Conclusions

For the samples corresponding to the yogurt of monomodal structure, homogeneity of the protein and lipid phases is noted. The fat globules, obtained after homogenization, of small and uniform size, are clearly connected to the protein network during the fermentation step, resulting in the formation of a dense mixed network, with substantial nesting of the fat globules in the protein network.

The structure of the samples corresponding to the yogurt according to the invention may be considered as being very different insofar as the aggregates, with a predominance of fat, are clearly present with the simultaneous presence of a relatively dense protein network. Furthermore, the presence of isolated particles not connected to the protein network is clearly observed.

These observations thus clearly demonstrate a difference between the structure of the samples.

The invention claimed is:
1. A yogurt, wherein the yogurt:
has a bimodal structure that comprises fat globules connected to a protein-fat mixed network and free fat globules; and
comprises 7% to 14% by weight of a homogenized cream, relative to the total weight of the finished product;
wherein the fat globules connected to the protein-fat mixed network have a particle diameter ranging from 10 to 140 μm and the free fat globules have a particle diameter ranging from 0.05 to 3 μm.
2. The yogurt as claimed in claim 1, wherein the yogurt comprises a flavored preparation.
3. The yogurt as claimed in claim 2, wherein the flavored preparation is a chocolate-flavored preparation.
4. The yogurt as claimed in claim 2, wherein the flavored preparation is a vanilla-flavored preparation with chocolate chips.
5. A process for preparing a yogurt having a bimodal structure that comprises fat globules connected to a protein-fat mixed network and free fat globules, wherein the process comprises mixing of at least 56% by weight of yogurt bulk with 7% to 14% by weight of homogenized cream, relative to the total weight of the finished product;
wherein the fat globules connected to the protein-fat mixed network have a particle diameter ranging from 10 to 140 μm and the free fat globules have a particle diameter ranging from 0.05 to 3 μm.
6. The process of claim 5, wherein the yogurt bulk is stirred.
7. The process of claim 5, wherein, in the mixing step, the homogenized cream is incorporated in-line or in-tank into the yogurt bulk and then mixed with the yogurt bulk in-tank or in-line in a static mixer or in a dynamic mixer.

8. The process of claim 5, wherein the process further comprises incorporating a flavored preparation into the yogurt of bimodal structure, after the mixing step.

9. The process of claim 8, wherein the flavored preparation is incorporated in-line or in-tank into the yogurt of bimodal structure and then mixed in-tank or in-line by means of a static or dynamic mixer.

10. The process of claim 8, wherein the flavored preparation incorporated is a chocolate-flavored preparation or a vanilla-flavored preparation with chocolate chips.

11. The process of claim 5, wherein the homogenized cream is obtained by homogenization under a pressure from 150 to 350 kg/cm$^2$.

* * * * *